(12) United States Patent
Denes

(10) Patent No.: US 7,123,140 B1
(45) Date of Patent: Oct. 17, 2006

(54) NETWORK FOR REMOTE ADMINISTRATION OF STREET LIGHTING INTER ALIA AND METHODS TO CARRY OUT SAID ADMINISTRATION

(75) Inventor: Alain Denes, Montigny le Bretonneux (FR)

(73) Assignee: Laboratoire dÉlectronique, Mecanique, Pyrotechnique et Informatique Applique, Reims (FR)

( * ) Notice: Subject to any disclaimer, the term of this patent is extended or adjusted under 35 U.S.C. 154(b) by 773 days.

(21) Appl. No.: 10/009,024

(22) PCT Filed: May 30, 2000

(86) PCT No.: PCT/FR00/01496

§ 371 (c)(1),
(2), (4) Date: Mar. 11, 2002

(87) PCT Pub. No.: WO00/76034

PCT Pub. Date: Dec. 14, 2000

(30) Foreign Application Priority Data

Jun. 8, 1999 (FR) .................................. 99 07176
Sep. 3, 1999 (FR) .................................. 99 11094

(51) Int. Cl.
*G08B 1/08* (2006.01)
*H04Q 7/00* (2006.01)

(52) U.S. Cl. .............................. 340/539.1; 340/538.11; 340/538.15

(58) Field of Classification Search ............. 340/539.1, 340/538.11, 538.15, 310.11, 310.16, 332
See application file for complete search history.

(56) References Cited

U.S. PATENT DOCUMENTS

| | | | |
|---|---|---|---|
| 4,199,072 A * | 4/1980 | Jacks | 220/3.4 |
| 4,516,054 A | 5/1985 | Shikama et al. | |
| 4,654,541 A | 3/1987 | Angott | |
| 4,691,341 A | 9/1987 | Knoble et al. | 379/97 |
| 4,995,053 A | 2/1991 | Simpson et al. | 375/1 |

(Continued)

FOREIGN PATENT DOCUMENTS

| | | |
|---|---|---|
| DE | 40 14054 A1 | 7/1991 |
| DE | 40 14 054 A1 | 11/1991 |
| WO | WO 97/31430 | 8/1997 |

(Continued)

OTHER PUBLICATIONS

Translation of the International Preliminary Examination Report for International Application No. PCT/FR00/01496.

*Primary Examiner*—John Tweel, Jr.
(74) *Attorney, Agent, or Firm*—Welsh & Katz, Ltd.

(57) ABSTRACT

A wireless network for remotely controlling at least one lamp includes a first radio transceiver associated with the at least one lamp and a second radio transceiver. The first radio transceiver further includes a circuit for controlling the at least one lamp as a function of a message repeated by a second radio transceiver.

20 Claims, 4 Drawing Sheets

U.S. PATENT DOCUMENTS

| | | | |
|---|---|---|---|
| 4,998,095 A | 3/1991 | Shields | |
| 5,121,287 A | 6/1992 | Lee | 361/331 |
| 5,161,874 A * | 11/1992 | Benes | 362/552 |
| 5,237,264 A | 8/1993 | Moseley et al. | 323/324 |
| 5,874,903 A | 2/1999 | Shuey et al. | 340/870.02 |
| 5,886,738 A | 3/1999 | Hollenbeck et al. | 348/151 |
| 6,370,489 B1 * | 4/2002 | Williams et al. | 702/188 |
| 6,636,150 B1 * | 10/2003 | Williams | 340/506 |
| 6,714,895 B1 * | 3/2004 | Williams et al. | 702/188 |
| 6,807,516 B1 * | 10/2004 | Williams et al. | 702/188 |
| 6,888,320 B1 * | 5/2005 | Denes | 315/274 |
| 6,892,168 B1 * | 5/2005 | Williams et al. | 702/188 |
| 6,912,408 B1 * | 6/2005 | O'Neill et al. | 455/561 |

FOREIGN PATENT DOCUMENTS

| | | |
|---|---|---|
| WO | WO 97/34272 | 9/1997 |
| WO | WO 98/13945 | 4/1998 |

\* cited by examiner

NETWORK FOR REMOTE ADMINISTRATION OF STREET LIGHTING INTER ALIA AND METHODS TO CARRY OUT SAID ADMINISTRATION

CROSS-REFERENCE TO RELATED APPLICATIONS

This application claims the benefit of priority from International Application No. PCT/FR00/01496 filed May 30, 2000, which claims the benefit of priority from French Application No. 99 07 176 filed Jun. 8, 1999 and French Application No. 99 11 094 filed Sep. 3, 1999, which are currently pending.

FIELD OF THE INVENTION

The present invention relates to a wireless data transmission network, a street lamp for implementing this network as well as a connection box. It also relates to a method for switching on the lamp of the street lamp according to the invention. The invention further relates to a method of remote administration of lighting in the network of the invention and a method for initializing the network.

BACKGROUND

Currently to date, there is no simple, effective and economical solution for undertaking the remote administration of lighting in urban zones.

The aim of the present invention is to propose a solution to this problem.

To this end, the present invention proposes a street lamp having at least one lamp and a radio transceiver. The transceiver can advantageously be supplied electrically by the street lamp.

SUMMARY

According to a preferred embodiment, the transceiver comprises a circuit for controlling the street lamp. The controlling circuit can advantageously control the switching on and switching off of the street lamp. Moreover, the controlling circuit can advantageously vary the power delivered to the lamp. Finally, the controlling circuit can advantageously perform at least one of the following measurements:

measurement of the electric current consumed by the lamp;

measurement of the outside temperature or that of the controlling circuit;

measurement of the outside brightness;

measurement of the phase shift between current and voltage supplying the street lamp;

the controlling circuit furthermore being able to comprise a memory for storing one or more measurements performed.

According to another preferred embodiment, the controlling circuit measures the electric current consumed by the lamp and cuts off the electrical supply to the street lamp as a function of the measured current.

According to yet another preferred embodiment, the street lamp comprises a chopped supply supplying the lamp. Preferably, the chopped supply selectively delivers to the lamp at least a first voltage and a second voltage lower than the first voltage. The chopped supply can advantageously deliver at least one third voltage to the lamp selectively. The controlling circuit can advantageously control the chopped supply, in particular so as to determine the voltage to be applied to the lamp. Moreover, the chopped supply can advantageously also supply the transceiver.

According to yet another preferred embodiment, the lamp is an electric discharge lamp, preferably, a mercury vapor lamp or a sodium vapor lamp.

According to another aspect, the invention proposes a method for switching on the lamp of the above street lamp, characterized in that the switching on of the lamp comprises:

the application to the lamp of the first voltage so as to start the lamp;

after the lamp is started, the application to the lamp of the second voltage so as to supply the lamp with a service voltage.

It is furthermore advantageous to apply the third voltage to the lamp so as to vary the intensity of lighting of the lamp.

According to yet another aspect, the invention proposes a connection box, with:

a female socket for receiving an electric lamp;

a radio transceiver;

means of electrical connection in electrical linkage with the socket.

According to a preferred embodiment, the means of connection form a male socket.

According to another preferred embodiment, the transceiver is supplied by way of the means of connection.

According to yet another preferred embodiment, the controlling circuit controls the opening or the closing of the electrical link between the means of connection and the female socket. Moreover, the controlling circuit can advantageously vary the power delivered to the female socket. Finally, the controlling circuit can advantageously perform at least one of the following measurements:

measurement of the electric current provided to the female socket;

measurement of the outside temperature or that of the controlling circuit;

measurement of the outside brightness;

measurement of the phase shift between current and voltage supplying the female socket;

the controlling circuit furthermore being able to comprise a memory for storing one or more measurements carried out.

According to yet another preferred embodiment, the controlling circuit measures the electric current provided to the first socket and opens the electrical link between the means of connection and the female socket as a function of the measured current.

According to yet another preferred embodiment, the electrical link comprises a chopped supply, the input of the chopped supply being linked to the means of connection, and the output of the chopped supply being linked to the female socket. Preferably, the chopped supply selectively delivers to the female socket at least a first voltage and a second voltage lower than the first voltage. Advantageously, the chopped supply selectively delivers at least a third voltage to the socket. Preferably, the controlling circuit controls the chopped supply, in particular so as to determine the voltage to be applied to the female socket. According to yet another preferred embodiment, the chopped supply furthermore supplies the transceiver.

According to another aspect, the invention proposes a wireless transmission network, comprising at least one street lamp as claimed in the invention, the radio transceiver constituting a node of the network. Preferably, the network comprises at least one second node disposed in an electrical cabinet supplying electricity to the street lamp or at least any one street lamp. Advantageously, the second node of the network controls the energy supply to the street lamp. Moreover, the second node of the network performs at least one of the following measurements:

verifying the presence of the supply voltage in the electrical cabinet;

measuring the currents delivered by the cabinet;

measuring the leakage currents;

measuring the induced currents;

detecting insulation losses;

measuring the corrosion potential;

the second node furthermore being able to comprise a memory for storing one or more measurements carried out.

According to a preferred embodiment, the network comprises at least one router placing any two nodes of the network in communication.

According to another aspect, the invention proposes a method for initializing the address of a node of the network according to the invention, characterized by:

the assigning of a default address to the node before it is placed in service;

the placing of the node in service;

the dispatching via the network of a message destined for the default address;

the dispatching of a response in return by the node having the default address;

on receipt of the response, dispatching via the network of a message, destined for the default address, for assigning a new address to the corresponding node as replacement for the default address.

Preferably, the new address is specific to the node.

According to another aspect, the invention proposes a method for the remote administration of lighting using a network according to the invention, characterized by:

the dispatching via the network of a controlling command destined for the first node or for the second node;

the reception and the execution of the controlling command by the first node or the second node.

According to a preferred embodiment, the controlling command is dispatched destined for the first node and the first node receives and executes the controlling command. The controlling command comprises the switching on or the switching off of the lamp of the street lamp. Moreover, the controlling command can comprise the measurement of at least one physical quantity, the method furthermore comprising the dispatching in return by the first node via the network of the result of the measurement. As a variant, the controlling command comprises the reading of the measurement of at least one physical quantity placed in memory by the first node, the method furthermore comprising the dispatching in return by the first node via the network of the measurement read in memory.

According to another preferred embodiment, the controlling command is dispatched destined for the second node and the second node receives and executes the controlling command. The controlling command can comprise the opening or the closing of the supply to the street lamp. Moreover, the controlling command comprises the measurement of at least one physical quantity, the method furthermore comprising the dispatching in return by the second node via the network of the result of the measurement. As a variant, the controlling command comprises the reading of the measurement of at least one physical quantity placed in memory by the second node and the method furthermore comprising the dispatching in return by the second node via the network of the measurement read in memory. Advantageously, the method can comprise:

the interrogation of the first node by the second node via the network;

the dispatching in return of the value of at least one physical quantity measured by the first node;

the reception and the storage of the physical quantity by the second node.

Within the meaning of the present invention, the word street lamp should be understood to mean any street lamp or other lighting element such as airport runway landing lights. The expression urban lighting will be understood to include any lighting infrastructure for towns or even for major industrial sites such as oil refineries, nuclear power plants or else the lighting for airport runways.

BRIEF DESCRIPTION OF THE DRAWINGS

Other characteristics and advantages of the invention will become apparent on reading the description which follows of a preferred embodiment of the invention, given by way of example and with reference to the appended drawing.

DETAILED DESCRIPTION

Figure 1:
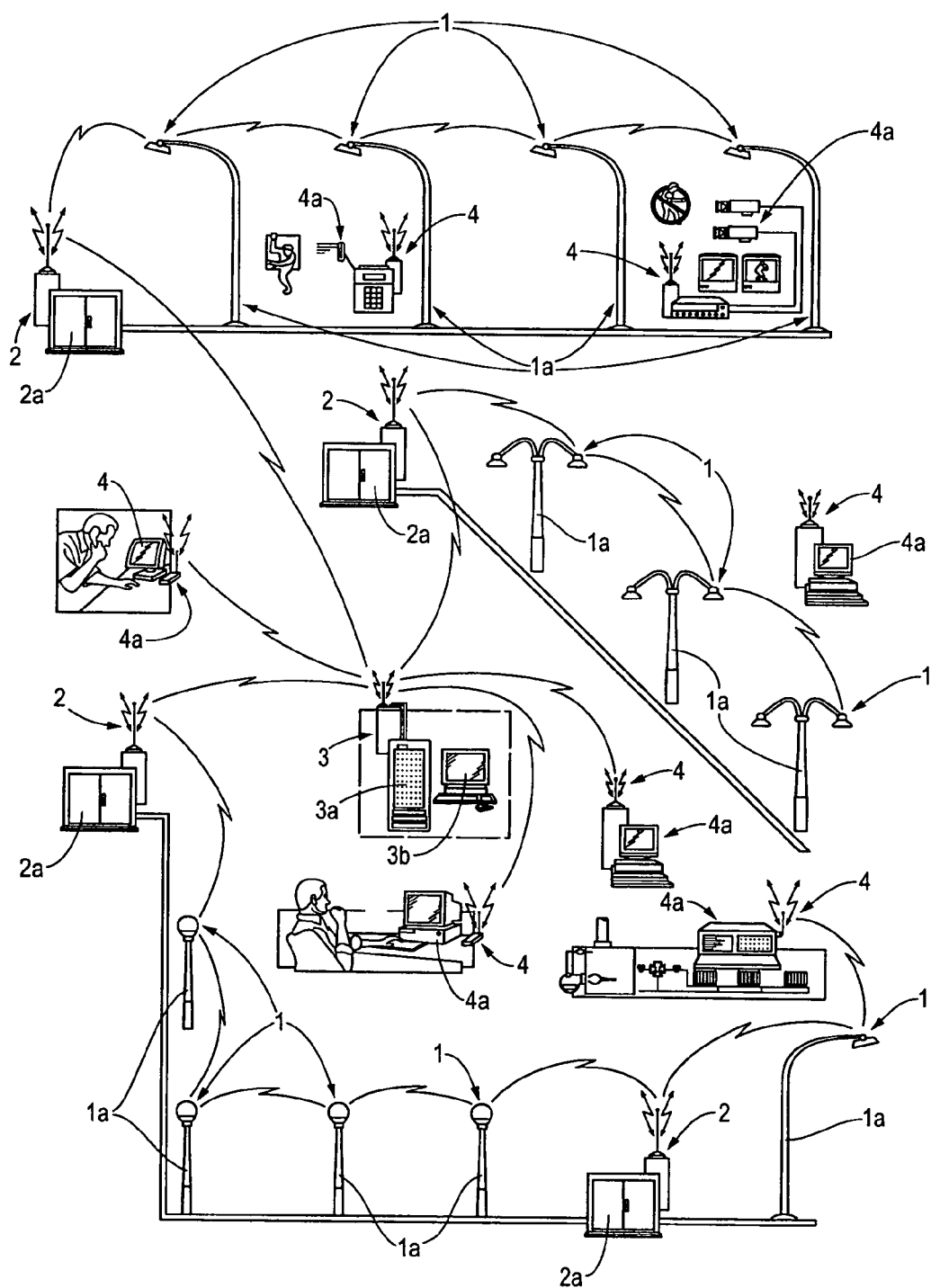
FIG. 1 illustrates a data radio transmission network according to a preferred embodiment of the invention.

In conjunction with FIG. 1, we shall describe a data radio transmission network according to a preferred embodiment of the invention.

The network comprises a plurality of radio transmission nodes 1. Each node 1 is disposed on a respective street lamp 1a. The network advantageously comprises radio transmission nodes 2. Each node 2 is disposed in a respective electrical cabinet 2a which supplies energy to a definite number of street lamps. Generally, an electrical cabinet 2 can supply up to 50 street lamps. The network can thus pertain to all the street lamps of a town as well as to all the electrical cabinets supplying these street lamps. Furthermore, the network advantageously comprises a radio transmission node 3 which cooperates with a router 3a.

As illustrated in FIG. 1, the network can also comprise nodes 4 disposed on or in proximity to adjunct elements 4a of the network which are neither street lamps, nor supply cabinets for street lamps. From the radio transmission point of view, the nodes 4 are constituted in a similar manner to the nodes 1 and cater for the same functions as a node 1 within the network.

Each node 1, 2 and 3 comprises a radio transceiver interfaced with an electronic controlling module comprising a microcontroller for administering the communications of the node. Each node 1, 2 and 3 can work under frequency modulation on for example 16 channels. The frequencies may preferably lie in the VHF, UHF bands or else the microwave frequencies, for example, of the order of 2.4 GHz. The propagation journey of the radio waves from one node to another may be performed as a direct space wave. The controlling module is preferably capable of choosing the communication channel automatically by measuring the signal/noise ratio on each channel so as to select the one which exhibits the best ratio. Moreover, it advantageously comprises an automatic gain control unit so as to be able to combat the fading of the signal and the scattering of the signal by obstacles.

The nodes 1 can advantageously be supplied electrically through the electricity feeder supplying the street lamp 1a on which it is disposed. Similarly, the nodes 2 may advantageously be supplied electrically through the electricity feeder supplying the electrical cabinet 2a in which it is disposed.

A mode of communication between the nodes of the network may be as follows. It is specified that for the description of this mode of communication, any reference to a node 1 and to the street lamp 1a associated therewith corresponds equally, either actually to a node 1 and to the associated street lamp 1a, or to a node 4 and to the associated adjunct element 4a.

The node 3 is able to communicate with all the nodes 2. To do this, the node 3 can comprise a single radio transmission system for communicating sequentially with the nodes 2. The node 3 can also comprise several radio transmission systems so as to be able to communicate simultaneously with several nodes 2.

Each node 2 is capable of communicating with a corresponding set of nodes 1 which will subsequently be termed attached nodes 1. Preferably, the nodes 1 attached to a node 2 are those disposed on the set of street lamps 1a supplied with energy by the electrical cabinet 2a in which the relevant node 2 is disposed. Communication between a node 2 with each of the attached nodes 1 can be done directly. However, it is more advantageous for the communication between a node 2 and any attached node 1 to be done by repeating the communication through other attached nodes 1 which are, however, intermediate from the spatial point of view between the node 2 and the relevant node 1. Stated otherwise, each node 1 can serve as repeater for one or more neighboring nodes 1. The expression repeating of the message by a node should be understood to mean the receiving of the message by this node which, after methoding by its controlling module, forwards it—in the form of a new frame—destined for another node. As a variant, repetition could consist conventionally of a reamplification of the signal. Since the street lamps are generally aligned along the street, the communication between a node 2 and any attached node 1 may thus be done by way of the nodes 1 of all the intermediate street lamps 1a between the electrical cabinet 2a of the node 2 and the street lamp 1a of the relevant node 1, the intermediate nodes 1a retransmitting on each occasion to the next the message from the node 2 to the relevant node 1 or vice versa. This mode of transmission defines a veritable transmission chain between the node 2 and the attached nodes 1. Quite obviously, the node 2 is in direct communication with the attached node or nodes 1 which are spatially closest to it. In this configuration—which is illustrated by FIG. 1—, each node 2 is at the head of a transmission chain comprising all the nodes 1 which are attached to it. As a variant, it is possible to have a node 2 at the head of several separate transmission chains which are each composed of nodes 1 which are attached to it; for example, a chain composed of the nodes 1 of the street lamps 1a situated on one side of a street and a second chain composed of the nodes 1 of the street lamps 1a situated on the other side of this street, the two chains having at their end the same node 2 of the electrical cabinet 2a which supplies them. As a variant, it is possible that the transmission chains may subdivide into several transmission subchains, a node 1 of the chain situated at the head of a pluralities of subchains each composed of nodes 1 attached to the same node 2 at the head of the chain; this particular case can be used when a cabinet 2a supplies the street lamps 1a of a first street and then also those of a second secant street. It is not of course necessary for the transmission chains as described, to be homogeneous, that is to say to have at the head a node 2 which is followed by one or more nodes 1—or nodes 4 akin to nodes 1. It is for example possible to have a node 1—or a node 4—at the head of the chain or else to have a node 2 between two nodes 1 of the chain, the latter case being illustrated by the lower chain in FIG. 1.

Moreover, it is advantageous for the transmission range of each attached node 1 to cover several other attached nodes 1. Likewise, it is advantageous for a node 2 to be able to communicate with several attached nodes 1. Thus, in the case of a failure of a node 1 preventing it from repeating a message, the node 1—or the node 2—which has attempted to send it a message in vain, will be able to forward it to another node 1, which has not failed, so as not to interrupt the transmission chain. To do this, given that two successive street lamps are generally placed at least 30 m apart, the power of each of the nodes may be determined so as to cover for example a distance of 100 to 200 m so as to cover at least three successive nodes 1, this corresponding to a power of between around 1 and 2 W. The nodes 1 and 2 may each be fitted with an omnidirectional antenna. It is advantageous for each node of the chain to dispatch an acknowledgement of receipt message to the previous node which addressed a message to it; in this way, each node of the chain can easily determine whether the next node has failed and if so, resend the message to another node of the chain.

The node 3 can also communicate with each of the nodes 1 by way of the node 2 to which it is attached, the node 2 serving as repeater. In fact, it is advantageous for the router 3a to implement steering functions making it possible to set up a communication between any two nodes of the network, by harnessing for example the same prerogatives of addressed steering as those handled by the automatic exchanges of conventional STN telephony, except to state that in this instance we are dealing with a link over the airwaves.

Communication between the node 3 and the nodes 2 can be done directly in which case they will generally need a power greater than that of the nodes 1 to cover the bigger distances. The nodes 2 may comprise a directional antenna oriented towards the node 3 while the node 3 will preferably have an omnidirectional antenna. Since communication in the network is done on the one hand between the node 3 and the nodes 2 corresponding to a first level of communication and on the other hand between each node 2 and the attached nodes 1a corresponding to a second level of communication, different radio transmission frequencies and protocols may be used for each of the stages. In this case, the nodes 2 will comprise two transceivers each corresponding to one of the stages of communication. Moreover, it is also possible to set up the communication between the node 3 and nodes 2 by using intermediate radio transmission nodes in the guise of repeaters in a similar manner to the previously described repetition between the nodes 2 and the nodes 1. The repeaters between the node 3 and a node 2 may be other nodes 2, or even also nodes 1.

This mode of communication could also be used in networks other than that of FIG. 1. Quite obviously, the network may also implement modes of communication other than that described.

The network can advantageously implement an interactive method of addressing so as to assign an address to each node as follows. The controlling module for each node of the network has in memory, for example an EEPROM memory, an identification number serving as address on the network therefor. During manufacture thereof, before installation on site, one and the same default identification number is allocated to all the nodes. Each node is put into service one after the other on the site so as to participate in the network, as follows. After a node is initially put into service on the site, the router 3 or any central administration station sends an interrogation message to this node having as address the default identification number. The latter returns an acknowledgement of receipt in response. The router 3 or the central station then sends it a new message indicating thereto a new specific identification number which will constitute its address in the network. On receipt, the node involved will replace in memory the default identification number by this new number. Once its new number is in memory, the placing of another node into initial service can proceed in the same manner. The procedure can obviously be automated by cyclically sending an interrogation message for the attention of any node that might have the default identification number. In case of response, the router 3 or the central station will know that a new node has been put into service and will then be able automatically to allocate a specific identification number thereto. On the other hand, a lack of response signifies the absence of the putting into service of a new node or possibly its failure. This interactive method of addressing can be put in place in networks other than that of the invention. The network according to the invention can obviously also use another method of addressing.

The routing of the messages between any two nodes which wish to communicate with one another can be carried out according to methods known per se. For example, it can be carried out as follows. Within a transmission chain, each of the nodes has a number consecutive to the previous one as address. Hence, any node receiving a message addressed to it by another node verifies the content of the message which contains the address of the node which has sent it thereto and the address of the final destination node of the message. If the node in question is not the final destination, it forwards the message. If the node which had sent it thereto has an address (n−1) less than its own (n), it sends it to the address (n+1) immediately greater than its own. On the other hand, if the node which had sent it thereto has an address (n+1) greater than its own (n), it sends it to the address (n−1) immediately less than its own. Quite obviously, the router 3 carries out the steering between the various chains.

The network may be of the random access type in which a node transmits after it has noted, by listening to it, that the channel is free. Or advantageously, the network is of the controlled access type in which a node, preferably the node 3, is master and it alone gives the entitlement to communicate to the other nodes, for example by polling.

We shall now describe a system for the remote administration of urban or similar lighting using the network of the invention. In this application, it is advantageous for the network to implement the mode of communication and the method of addressing described earlier, but others could be used.

The controlling module for each of the nodes 1 of the street lamps 1a which one wishes to administer is supplemented with a street lamp controlling unit. This street lamp controlling unit can in particular fulfill one or more of the following functions:

control the switching on or switching off of the lamp of the street lamp 1a on which this node 1 is disposed;

administer the starting of the lamp;

vary the supply power delivered to the lamp;

measure the electric current consumed by the lamp;

determine the phase shift between the current and the voltage (cos φ);

measure the brightness at the level of the lamp;

measure the outside temperature or that inside the electronic module.

These functions may be implemented in a manner known per se.

The controlling module for the node of the street lamp will be able to store in its memory the data thus measured.

In the case where the street lamp controlling unit comprises means for measuring the electric current consumed by the lamp, it will advantageously be able to cut the supply to the lamp of the street lamp 1a should a surge be measured so as to make the street lamp safe. In this case, it is preferable for the lamp to be turned back on manually or for this to require a command dispatched to the street lamp controlling module by the supervisory station described later.

Similarly, the controlling module for each of the nodes 2 of the electrical cabinets 2a which one desires to administer is supplemented with an electrical cabinet controlling unit. This electrical cabinet controlling unit can in particular fulfill one or more of the following functions:

control in the electrical cabinet 2a of the associated node 2 the opening or the closing of the supply circuit for the street lamps supplied by this cabinet;

verify the presence of the supply voltage of the cabinet;

measure the currents delivered to the street lamps by the cabinet, or the induced currents or the leakage currents, etc;

detect insulation losses;

measure the corrosion potential.

The measurements and verificatory checks may be carried out continually in a continuous manner. The opening/closing of the supply circuit for the street lamps supplied by the cabinet can be done in accordance with the ambient brightness or in accordance with internal scheduling programs.

These functions can be implemented in a manner known per se.

The controlling module for the node 2 of the cabinet will be able to store in its memory the data thus determined.

Moreover, a supervisory station 3b, typically a computer furnished with a screen, is linked to the router 3. It could also be linked to any node of the network. This supervisory station runs a program intended to control the street lamps 1a and the cabinets 2a by dispatching messages via the network to the corresponding nodes 1 or 2. The controlling modules for these nodes 1 or 2 will be able to implement the orders contained in the J messages originating from the supervisory station. The orders thus delivered will obviously be able to relate to any function implementable by the controlling module for the node 1 or 2 in regard to the operation of the street lamp 1a or of the corresponding electrical cabinet 2a, in particular those mentioned above. Similarly, the supervisory station will be able, via the network, to request any node 1 or 2 to send it in response the measurements and other detections relating to the operation of the street lamp or of the electrical cabinet, which are carried out and stored in memory by the controlling module for the corresponding node. The supervisory station will be able to method the data thus shipped back, maintain logs for these data and also control the street lamps and electrical cabinets as a function of these data. The supervisory station will preferably undertake the collection of the data in a sequential manner.

More generally, the supervisory station can be given the job of routing the messages—in conjunction with the router 3—and of managing all the nodes of the network.

As a variant, the nodes 2 can cyclically, or on request from the supervisory station, interrogated the nodes 1 attached so that the latter transmit thereto the measurements and other detections relating to the operation of the street lamp. The lamp 2 will then be able stored in its memory these data. In this case, the supervisory station will be able to obtain all the data relating to the street lamps 1 directly from the nodes 2, without interrogating the nodes 1 itself.

The correct administration of the lighting installations of a town, in the manner described above, requires only a tiny burden of work for the various component elements of the network. It is therefore advantageous to use the time left free by the remote administration of the urban lighting for communication with or between adjunct equipment 4a of the network, other than street lamps or electrical cabinets supplying street lamps. Each such item of adjunct equipment 4a is then linked to a radio transmission node 4 which is arranged on the adjunct equipment or in proximity thereto. Each node 4 comprises the same elements as a node of type 1 or 2, namely a transceiver administered by an electronic controlling module. Since the adjunct equipment 4a can be heterogeneous, the controlling module for node 4 is linked to the corresponding item of adjunct equipment 4a preferably by way of a protocol-matching modem. A node 4 fulfils the same functions in the network as any node 1 from the radio transmission point of view.

The adjunct element 4a will then be able to communicate across the network with another adjunct element 4a or with the supervisory station—or vice-versa—.

By way of example, an adjunct element 4a can consist of another supervisory station dedicated to the administration or to the surveillance, via the network, of other adjunct elements such as:

traffic lights governing the flow of traffic or other roadway signals;
alarm installations in buildings;
display hoardings installed across the town;
road traffic surveillance cameras for, in particular, transmitting the images from the camera to the supervisory station via the network.

The adjunct elements 4a may also be mobile in nature. Thus, adjunct elements 4a may consist of badges incorporating a transmitter and worn by persons subject to illnesses. Pressing a button of the badge causes an alert message to be sent to a help center—which is another adjunct element 4a—via the network, making it possible both to identify the person concerned through the identification number of the transmitter and to locate the person in question by investigating the identification number of the nearest node or nodes 1.

Similarly, a radio messaging service can be effected between a broadcasting center and receivers via the network. The network can also be used as fixed or mobile telephony network, for example, dedicated to municipal employees.

Figure 2:
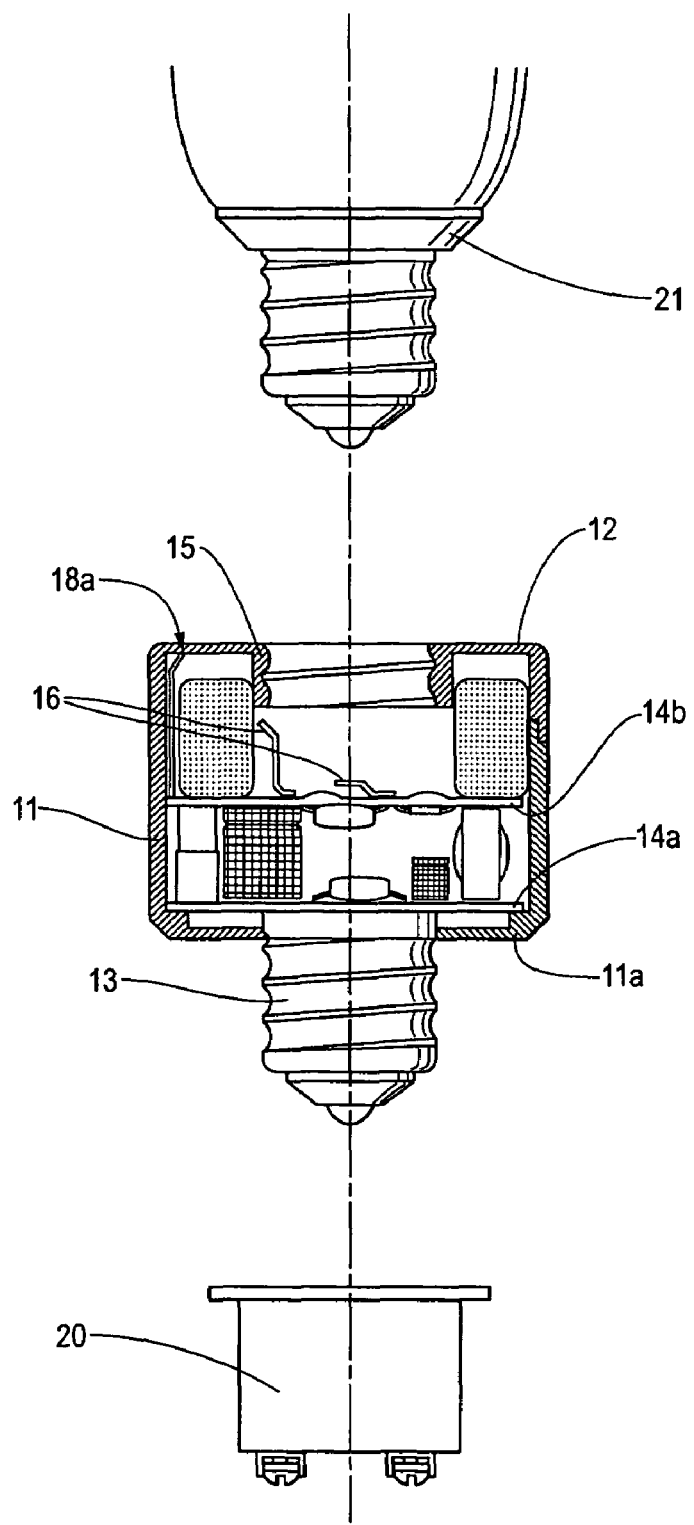
FIG. 2 illustrates a lamp adapter socket according to one aspect of the invention.
Figure 3:
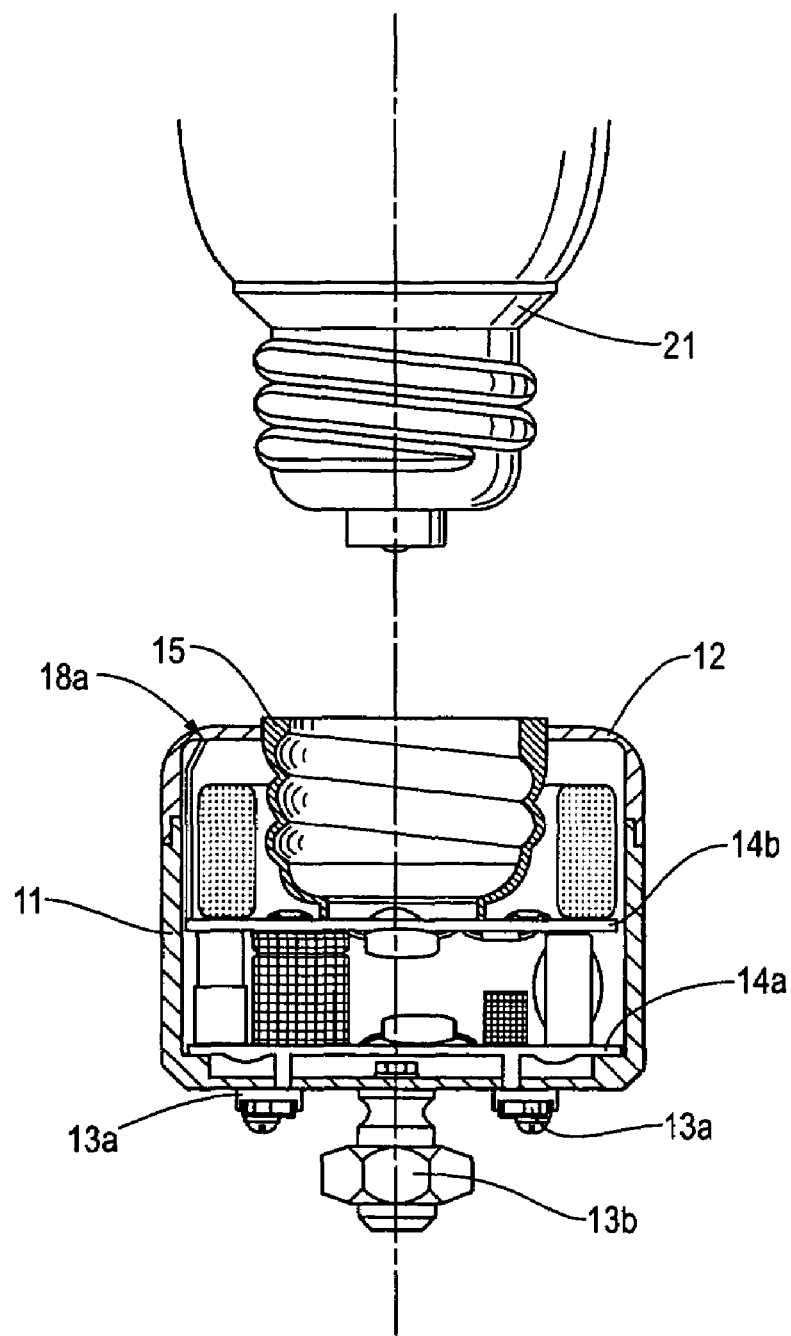
FIG. 3 illustrates a variant of the lamp adapter socket of FIG. 2.

In conjunction with FIG. 2, we shall now describe a lamp adapter socket 10 especially adapted to constitute a node 1 of the network described above.

The lamp adapter socket 10 comprises a box 11 closed by a cover 12. A male socket 13 of screw type—similar to a lamp base—is arranged in the bottom 11a of the box 11 and projects out of the box 11. The male socket 13 is able to be connected into a female socket 20 with which a street lamp 1a is equipped. The cover 12 clips onto the box 11. It can furthermore be glued to ensure complete leaktightness.

A printed circuit 14a is arranged inside the box. The socket 13 is linked electrically to the printed circuit 14a. A second printed circuit 14b is arranged in the box 11 between the cover 12 and the printed circuit 14a. A female socket 15 of screw type is arranged in the cover 12. The printed circuit 14b comprises pads 16 able to ensure electrical contact with a corresponding bulb 21 when the latter is screwed into the socket 15.

Consequently, the lamp adapter socket 10 can be mounted in the conventional female socket of a street lamp which customarily receives the bulb directly but which is now received by the female socket 15 of the lamp adapter socket 10. Of course, the sockets 13 and 15 may be of any suitable type, other than screw type. As a variant, FIG. 4 proposes a lamp adapter socket in which the male socket 13 is replaced by a connection strip 13a placed on the outside face of the bottom 11a of the box 11 and by a threaded rod 13b also arranged on the outside face of the bottom 11a to allow the fixing of the lamp adapter socket 10 with the aid of a nut.

Figure 4:
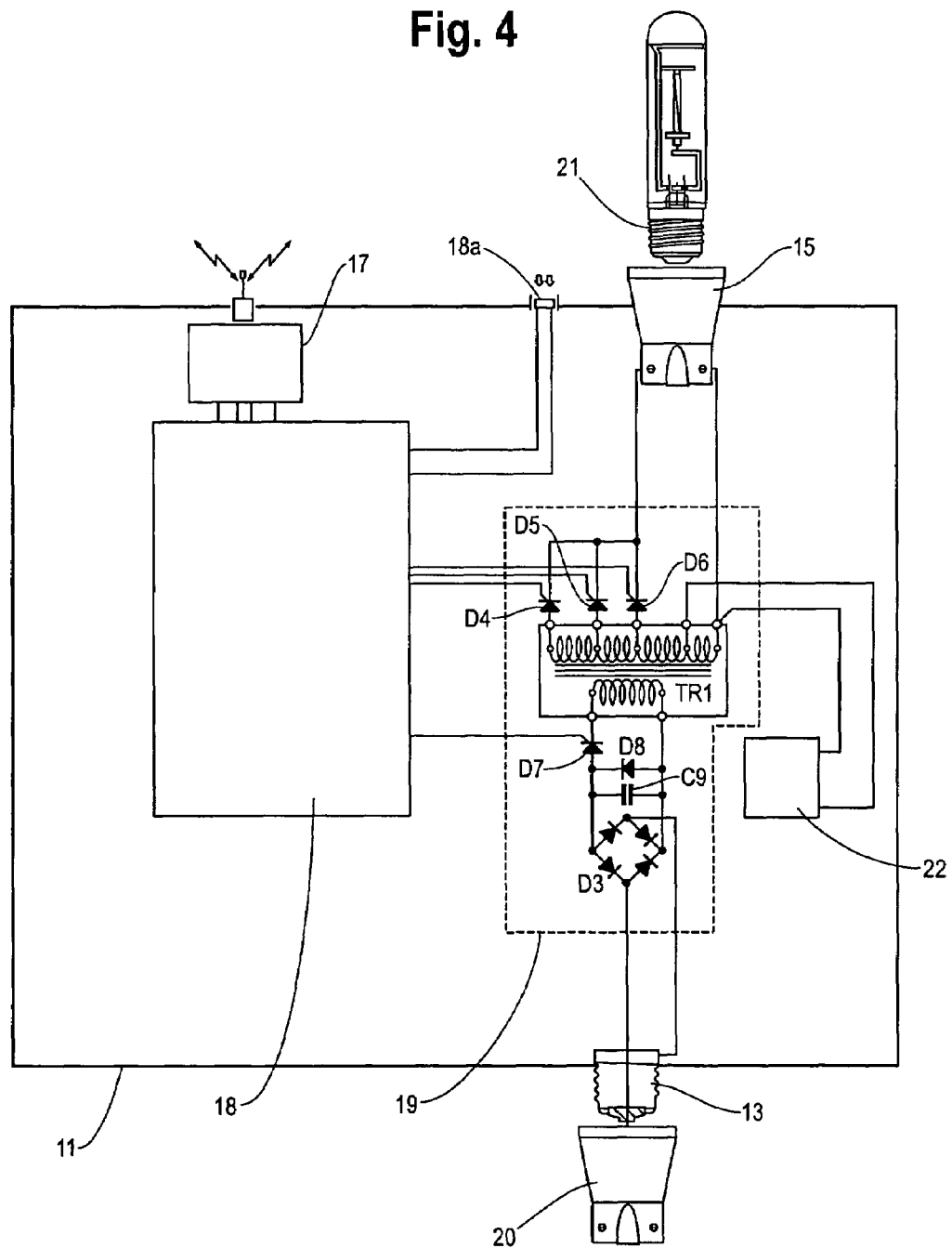
FIG. 4 is a diagram illustrating the electronics contained in the lamp adapter socket of FIG. 2 or 3.

The two printed circuits 14a and 14b are linked electrically to one another and comprise the following electronic circuits, as illustrated by FIG. 4:

a radiofrequency transceiver 17;
a microprocessor-based electronic controlling module 18;
a chopped supply 19.

The transceiver 17 is interfaced with the controlling module 18 which administers the communications of the transceiver 17. The transceiver 17 and the controlling module 18 are known per se and may advantageously exhibit the characteristics and functions described for these elements in conjunction with the description of the nodes 1. In particular, the controlling module 18 will be able to comprise a memory of the EEPROM type for storing an identification number serving for addressing in the network. It will also be able to comprise a photosensitive cell 18a arranged for example in an orifice made on the cover or in a side wall of the box 11 so as to measure the brightness outside the box. More generally, we recall that the controlling module 18 will be able to include a street lamp controlling unit able in particular to fulfil one or more of the following functions:

control the switching on and the switching off of the lamp mounted in the socket 15 of the lamp adapter socket 10 which is itself mounted on a street lamp 1a or the like;
administer the starting of this lamp;
vary the supply power delivered to this lamp;
measure the electric current consumed by this lamp;
determine the phase shift between the current and the voltage (cos $\phi$);
measure the outside temperature or that inside the electronic module.

These functions may be implemented in a manner known per se.

In the case where the street lamp controlling unit comprises means for measuring the electric current consumed by the lamp, it will advantageously be able to cut the supply to the lamp of the street lamp 1a should a surge be measured so as to make the street lamp safe. In this case, it is preferable for the lamp to be turned back on manually or for this to require a command dispatched to the street lamp controlling module by the supervisory station described later.

The transceiver 17 and the controlling module 18 are supplied with energy by way of the socket 13 when the lamp adapter socket 10 is mounted in a corresponding female socket 20 of a street lamp or the like which is supplied electrically.

Similarly, the chopped supply 19 receives its energy from the socket 13 and its outputs are linked to the pads 16 so as to supply the bulb 21 when it is placed in the socket 15.

The chopped supply 19 is advantageously controlled by the controlling module 18 so as to supply or not supply the bulb 21 and/or to vary the power delivered to the bulb 21.

By way of example, a box 11 of diameter 60 mm and depth 50 mm can suffice to receive all the abovementioned components.

In another embodiment, the radio transceiver 17 is replaced with a carrier-current transceiver.

To build a node 1 of the network of the invention, it is sufficient to mount a lamp adapter socket 10 on a street lamp 1a instead of the customary bulb 21. Stated otherwise, the male socket 13 of the lamp adapter socket 10 is mounted in the female socket 20 of the street lamp 1a which customarily receives the bulb 21, the latter being mounted henceforth in the female socket 15 of the lamp adapter socket 10.

We shall now describe the chopped supply 19 in greater detail.

The input of the chopped supply 19 is connected to a diode bridge D3 for rectifying the current. Preferably, a smoothing capacitor C9 and a zener diode D8 are wired in parallel with the outputs of the diode bridge D8 so as to smooth and stabilize the rectified voltage. The rectified voltage, possibly smoothed and stabilized, is applied to the primary winding of a transformer Tr1 by way of a controlled breaker D7 for gating at high frequency the voltage applied to the primary of the transformer Tr1. The controlled breaker D7 is in this instance a thyristor, but it could also be a power transistor or any other suitable component. The transformer Tr1 has a secondary winding with several outputs each delivering a different voltage. The first three outputs of the winding are each wired, via a respective controlled breaker D4, D5, D6, to the output of the chopped supply 19, that is to say to the socket 15 intended to receive the bulb 21. The controlled breakers D4, D5, D6 are of a similar type to the breaker D7.

The chopped supply 19 is especially suitable for supplying a bulb 21 of the electric discharge lamp type, and more especially, of the mercury vapor or sodium vapor lamp type.

To do this, the input of the chopped supply 19 is supplied, for example via a 230 V voltage of the network. The breaker D7 is switched at a high frequency of between around 30 kHz and 90 kHz. In our example, the frequency is 60 kHz. The gated signal thus obtained is applied to the primary winding of the transformer Tr1.

The secondary winding of the transformer Tr1 has a first output—that corresponding to the breaker D4—which delivers a sufficient voltage to cause the starting of the lamp. In our example, this voltage is 600 V.

The secondary winding of the transformer Tr1 has a second output—that corresponding to the breaker D5—which delivers a voltage corresponding to the nominal service voltage of the lamp. In our example, this voltage is 100 V.

The secondary winding of the transformer Tr1 can furthermore have a third output—that corresponding to the breaker D6—which delivers a voltage corresponding to a voltage slightly below the service voltage of the lamp, but sufficient to keep the lamp lit. In our example, this voltage is 90 V.

To start the lamp, the breaker D4 is closed and the breakers D5 and D6 are kept open. When the lamp is started, the breaker D5 is closed while the breaker D4 is opened so as to apply the nominal service voltage to the lamp. Two methods may be used to determine that the lamp has started:

either by the elapsing of a fixed time from the commencement of the application of the starting voltage—that is to say from the closing of the breaker D4;

or as a function of the current consumed by the lamp which may be determined by a conventional current measuring circuit on the basis of which the controlling module 18 can control the breakers D4 and D5.

If it is desired to decrease the brightness produced by the lamp, the breaker D6 is closed while the breaker D5 is opened so as to apply the voltage slightly below the nominal service value to the lamp.

The person skilled in the art will understand that the third output of the secondary winding is optional. On the other hand, it is also possible to have several outputs to the secondary winding each delivering a respective voltage lying in the nominal operational voltage span of the lamp.

Of course, to turn off the lamp, it is sufficient to open the breakers D4, D5 and D6. Another possibility consists in keeping the breaker D7 open.

The breakers D4, D5, D6 and D7 are controlled by the controlling module 18.

The secondary winding of the transformer can again advantageously have an additional low-voltage output—for example 12 volts—so as to supply the transceiver 17 and the controlling module 18 and again optionally other electronic circuits, by way of a rectifying and filtering circuit 22.

The person skilled in the art will understand that the chopped supply 19 is a module independent of the other elements housed in the lamp adapter socket. In particular, the chopped supply 19 can be used to supply a discharge lamp independently of the transceiver 17. It is thus possible to produce a lamp adapter socket comprising no transceiver 17, but including a chopped supply of the type 19 with a specific control module for controlling the various breakers D4 to D7. Such a lamp adapter socket will be usable in particular in the case where it is not desired to control the lamp remotely.

It is also possible to supplement it with just a receiver instead of a transceiver so as to allow remote control of the lamp, but not to ship back data relating to the operating conditions. In this case, such a socket will not be able to constitute a node 1 of the network of the invention.

Finally, it is obvious that a chopped supply 19 such as this is not necessarily placed inside a lamp adapter socket. It could be housed for example directly in the street lamp.

The use of a chopped supply to supply a discharge lamp has several advantages:

it makes it possible to dispense with the accessories of the lamp, namely the starter and the ballast which are used at present and which exhibit greater weight and volume as compared with the chopped supply;

a chopped supply can be placed in a lamp adapter socket of the type described while the starter and the ballast of the existing type is too voluminous and heavy;

the steep voltage edges provided by the chopped supply facilitate the starting of the lamp;

the high chopping frequency prevents the flickering of the lamp.

Of course, the present invention is not limited to the examples and to the embodiment described and represented, but is open to numerous variants accessible to the person skilled in the art.

The invention claimed is:

1. A street lamp comprising:
   at least one electric lamp for lighting a street;
   a radio transceiver associated with the street lamp and having a control circuit for controlling the street lamp; and
   wherein the transceiver repeats to another street lamp at radio frequency, messages received at radio frequency.

2. The street lamp of claim 1 wherein the control circuit controls the switching on of the lamp.

3. The street lamp of claim 1 wherein the control circuit controls the switching off of the lamp.

4. The street lamp of claim 1 wherein the control circuit performs at least one the measurements selected from the group consisting of measuring an electric current consumed by the lamp, measuring an outside temperature, measuring a temperature of the control circuit, measuring an outside brightness, and measuring a phase shift between current and voltage supplied to the street lamp, and wherein the radio transceiver sends the result of the measurement.

5. The street lamp of claim 1 wherein the control circuit measures an electric current consumed by the lamp and reduces an electrical supply to the lamp as a function of the measured current.

6. The street lamp of claim 1 further comprising a chopped electrical supply configured to selectively deliver a first voltage and a second voltage to the lamp wherein the second voltage is less than the first voltage.

7. The street lamp as claimed in claim 6 wherein the control circuit controls the chopped electrical supply.

8. The street lamp of claim 6 wherein the lamp is an electric discharge lamp and wherein the chopped electrical supply starts the lamp by applying the first voltage to the lamp and after the lamp is started, the chopped electrical supply applies the second voltage to the lamp, the second voltage corresponding to a service voltage of the lamp.

9. A wireless network for remotely controlling at least one lamp, the network comprising:
   a first radio transceiver associated with a first lamp;
   a second radio transceiver associated with a second lamp; and
   wherein:
      the first radio transceiver includes a first circuit for controlling said first lamp as a function of a message received from and repeated by a second radio transceiver; and
      the second radio transceiver including a second circuit for controlling the second lamp.

10. A wireless network for remotely controlling at least one street lamp having at least one electric lamp for lighting the street, the network comprising:
    a first radio transceiver associated with a first street lamp having a first electric lamp for street lighting;
    a second radio transceiver associated with a second street lamp having a second electric lamp for street lighting; and
    wherein:
       the first radio transceiver includes a first circuit for controlling the first electric lamp as a function of a message received from and repeated by the second radio transceiver; and
       the second radio transceiver including a second circuit for controlling the second electric lamp.

11. The network according to claim 9, wherein the first circuit for controlling controls the switching on of the first lamp as a function of the message.

12. The network according to claim 9, wherein the first circuit for controlling controls switching off of the first lamp as a function of the message.

13. The network of claim 10, comprising a third radio transceiver arranged in an electrical cabinet supplying electrically the first and the second street lamps, wherein the third radio transceiver controls the electrical supply to the first and the second street lamps by the electrical cabinet.

14. The network of claim 13, wherein the third radio transceiver performs at least one the measurements selected from the group consisting of verifying the presence of a supply voltage in the electrical cabinet, measuring current delivered by the cabinet, measuring leakage currents, measuring induced currents, detecting insulation losses, and measuring corrosion potential, and wherein the second radio transceiver sends the result of the measurements.

15. The network of claim 10, wherein the first and second radio transceiver each define a node among a plurality of nodes of the network, the network further comprising at least one router configured to permit any two nodes of the network to communicate with each other.

16. The network of claim 9, wherein the first circuit for controlling measures at least one physical quantity, the first radio transceiver transmitting the result of the measurement of the at least one physical quantity over the network.

17. A method for initializing a network address of first radio transceiver in the network of claim 9 comprising the steps of:
    assigning of a default address to the first radio transceiver;
    placing the first radio transceiver in service;
    dispatching a message destined for the default address via the network;
    dispatching of a response returned by the first radio transceiver;
    on receipt of the response, dispatching via the network destined for the default address of a message for assigning a new address to said first radio transceiver as replacement for the default address.

18. The network according to claim 10, wherein the first circuit for controlling controls the switching on of the first electric lamp as a function of the message.

19. The network according to claim 10, wherein the first circuit for controlling controls switching off of the first electric lamp as a function of the message.

20. The network according to claim 13, wherein the second radio transceiver receives the message from and repeated by the third radio transceiver.

* * * * *